United States Patent
Braun et al.

(10) Patent No.: US 11,137,488 B1
(45) Date of Patent: Oct. 5, 2021

(54) RADAR EXCITATION SIGNALS FOR WIRELESS COMMUNICATIONS SYSTEM

(71) Applicant: NOKIA TECHNOLOGIES OY, Espoo (FI)

(72) Inventors: Volker Braun, Stuttgart (DE); Thorsten Wild, Stuttgart (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/923,618

(22) Filed: Jul. 8, 2020

(30) Foreign Application Priority Data

Mar. 10, 2020 (FI) .................................... 20205252

(51) Int. Cl.
  *G01S 13/02* (2006.01)
  *G01S 13/58* (2006.01)
  *G01S 13/87* (2006.01)

(52) U.S. Cl.
  CPC ........ *G01S 13/0209* (2013.01); *G01S 13/582* (2013.01); *G01S 13/872* (2013.01)

(58) Field of Classification Search
  CPC .... G01S 13/0209; G01S 7/282; G01S 13/582; G01S 13/872
  (Continued)

(56) References Cited

U.S. PATENT DOCUMENTS 6,232,912 B1 * 5/2001 Nagel .................. G01S 13/225
  342/104

6,975,665 B1 * 12/2005 McCorkle ............ H04B 1/7163
  375/130

(Continued)

FOREIGN PATENT DOCUMENTS

CA 3071181 C * 9/2020 ........... G01S 13/582
EP 2 093 589 A1 8/2009
(Continued)

OTHER PUBLICATIONS

H. Rohling and M. Kronauge, "New radar waveform based on a chirp sequence," 2014 International Radar Conference, Lille, 2014, pp. 1-4, doi: 10.1109/RADAR.2014.7060246. (Year: 2014).*

(Continued)

*Primary Examiner* — Vladimir Magloire
*Assistant Examiner* — Alexander L. Syrkin
(74) *Attorney, Agent, or Firm* — Squire Patton Boggs (US) LLP

(57) ABSTRACT

One radar excitation signal has a first burst duration and a first sampling period. Another radar excitation signal has a second burst duration and a second sampling period. The first sampling period of the first signal is configured for scanning a velocity range and the second sampling period of the second signal is configured for scanning a portion of the velocity range, and the first burst duration is smaller than the second burst duration. The at least two radar excitation signals are embedded into a frame structure for a wireless communications system. At least one radar operation comprising at least one transmission based on the frame structure is performed. In this way the overhead of the radar excitation signals on the air interface of the wireless communications system may be controlled, while supporting a fine velocity resolution and a sufficiently large maximum velocity for a monitored target.

13 Claims, 6 Drawing Sheets

(58) Field of Classification Search
USPC .......................................................... 342/21
See application file for complete search history.

(56) References Cited

U.S. PATENT DOCUMENTS

| | | | | |
|---|---|---|---|---|
| 10,215,841 | B2* | 2/2019 | Ginsburg | G01S 7/4008 |
| 2003/0102997 | A1* | 6/2003 | Levin | G01S 7/006 |
| | | | | 342/57 |
| 2011/0122921 | A1* | 5/2011 | McCorkle | H04B 1/7176 |
| | | | | 375/130 |
| 2013/0278455 | A1* | 10/2013 | Song | G01S 13/22 |
| | | | | 342/137 |
| 2016/0146933 | A1 | 5/2016 | Rao et al. | |
| 2017/0082744 | A1* | 3/2017 | Matsumoto | G01S 13/584 |
| 2017/0115395 | A1* | 4/2017 | Grauer | G01S 17/18 |
| 2017/0139036 | A1 | 5/2017 | Nayyar et al. | |
| 2017/0238320 | A1* | 8/2017 | Fukuta | H04W 72/04 |
| | | | | 370/329 |
| 2018/0014205 | A1* | 1/2018 | Tsai | H04W 16/14 |
| 2018/0348339 | A1* | 12/2018 | Lien | G01S 7/023 |
| 2018/0348340 | A1* | 12/2018 | Lien | G01S 13/581 |
| 2018/0348353 | A1* | 12/2018 | Lien | H01Q 3/40 |
| 2019/0044485 | A1 | 2/2019 | Rao et al. | |
| 2019/0293755 | A1* | 9/2019 | Cohen | G01S 7/295 |
| 2019/0391247 | A1 | 12/2019 | Gulati et al. | |
| 2020/0233076 | A1* | 7/2020 | Chen | G01S 7/4865 |

FOREIGN PATENT DOCUMENTS

| | | | | | |
|---|---|---|---|---|---|
| EP | 2 124 071 | A1 | | 11/2009 | |
| GB | 2558643 | A | * | 7/2018 | ............ G01S 13/284 |
| JP | 2002-267743 | A | | 9/2002 | |
| JP | 2002267743 | A | * | 9/2002 | |
| JP | 2017-058291 | A | | 3/2017 | |
| JP | 2017058291 | A | * | 3/2017 | ............ G01S 13/931 |
| KR | 10-2014-0102986 | A | | 8/2014 | |
| KR | 20140102986 | A | * | 8/2014 | ............ G01S 7/023 |
| WO | WO-2019010259 | A1 | * | 1/2019 | ............ G01S 7/354 |

OTHER PUBLICATIONS

Finnish Search Report dated Jun. 25, 2020 corresponding to Finnish Patent Application No. 20205252.

Communication of Acceptance under section 29a of Patents Decree dated Jun. 24, 2020 corresponding to Finnish Patent Application No. 20205252.

J. Fink et al, "Comparison of OFDM radar and chirp sequence radar." In: 2015 16th International Radar Symposium (IRS), IEEE, Jun. 24-26, 2015.

C. B. Barneto et al, "Full-Duplex OFDM Radar with LTE and 5G NR Waveforms: Challenges, Solutions, and Measurements." In: IEEE Transactions on Microwave Theory and Techniques IEEE, Aug. 19, 2019, vol. 67, No. 10, 4042-4054.

Notification of Reason(s) for Rejection (non-final) dated Sep. 14, 2020 corresponding to Japanese Patent Application No. 2020-127091, with concise statement of relevance.

Hermann Rohling et al: "New Radar Waveform based on a Chirp Sequence," 2014 International Radar Conference, Lille, 2014.

Extended European Search Report dated Jan. 27, 2021 corresponding to European Patent Application No. 20189827.7.

* cited by examiner

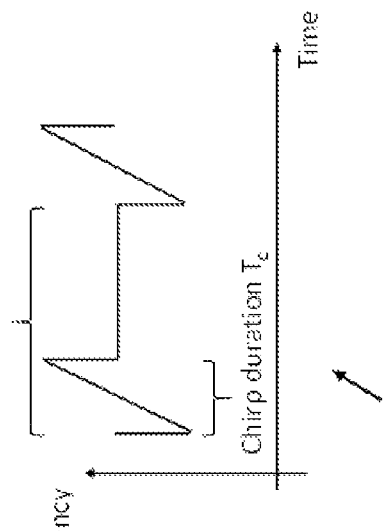
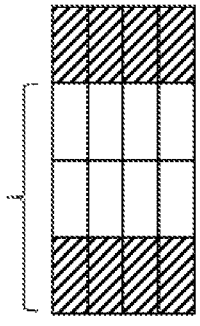
Fig. 4

RADAR EXCITATION SIGNALS FOR WIRELESS COMMUNICATIONS SYSTEM

TECHNICAL FIELD

The present invention relates to radar excitation signals for a wireless communications system.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Radar (Radio Detection and Ranging) is an emerging use case for wireless communications systems. A wireless communications system may be used both for exchanging data with mobile users and for pedestrian or vehicular traffic monitoring when deployed along roads, e.g. within cities or at highway bridges. Transmit signal of a Radar system is reflected by a target (e.g. a human or a car), and by processing the received signal it is possible to derive target properties such as distance, horizontal/vertical direction, velocity and/or size.

Joint use of the wireless communication system for communications and Radar introduces an overhead to the wireless communications system. Reducing the overhead can have a negative effect on velocity resolution and a sufficiently large maximum velocity of targets monitored by the Radar.

SUMMARY

The scope of protection sought for various embodiments of the invention is set out by the independent claims. The embodiments, examples and features, if any, described in this specification that do not fall under the scope of the independent claims are to be interpreted as examples useful for understanding various embodiments of the invention.

According some aspects, there is provided the subject matter of the independent claims. Some further aspects are defined in the dependent claims. The embodiments that do not fall under the scope of the claims are to be interpreted as examples useful for understanding the disclosure.

BRIEF DESCRIPTION OF THE DRAWINGS

For a more complete understanding of example embodiments of the present invention, reference is now made to the following descriptions taken in connection with the accompanying drawings in which:

FIG. 4 illustrates examples of radar excitation signals in accordance with at least some embodiments of the present invention;

DETAILED DESCRIPTION OF SOME EXAMPLE EMBODIMENTS

Figure 1:
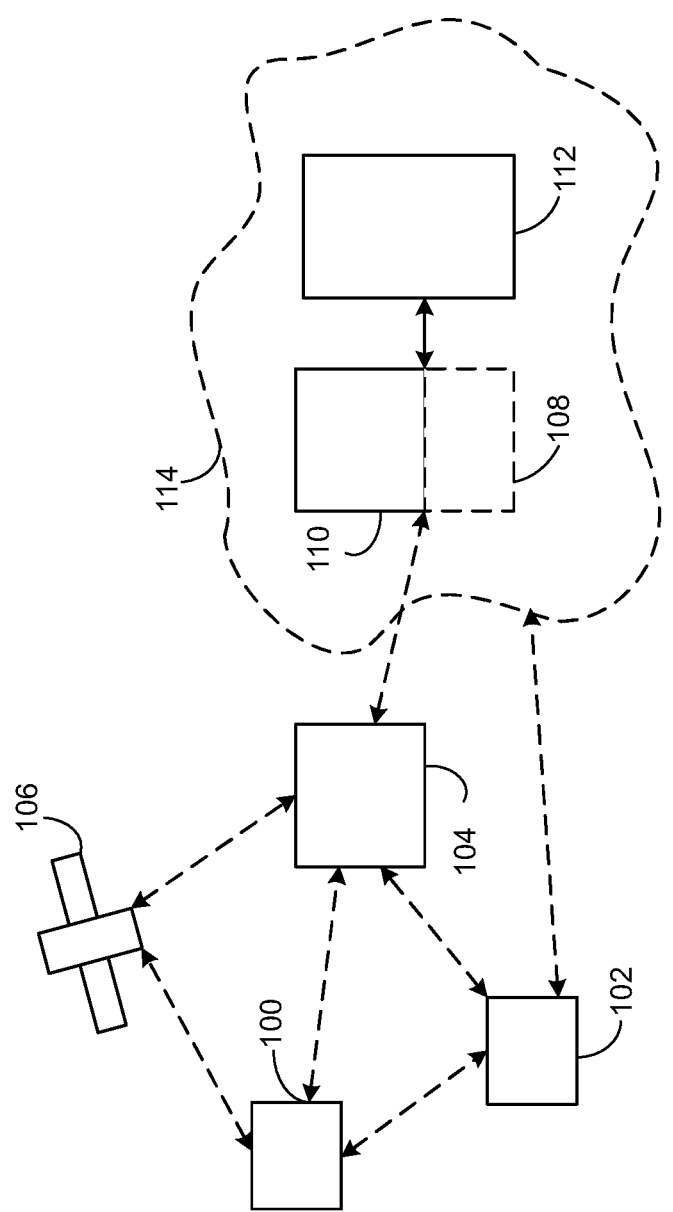
FIG. 1 shows a part of an exemplifying wireless communications access network in accordance with at least some embodiments of the present invention.

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

In connection with a radar operation on an air interface of a wireless communications system, at least two radar excitation signals are defined. One radar excitation signal has a first burst duration and a first sampling period. Another radar excitation signal has a second burst duration and a second sampling period. The first sampling period of the first signal is configured for scanning a velocity range and the second sampling period of the second signal is configured for scanning a portion of the velocity range, and the first burst duration is smaller than the second burst duration. The at least two radar excitation signals are embedded into a frame structure for the wireless communications system. At least one radar operation comprising at least one transmission based on the frame structure is performed. In this way the overhead of the radar excitation signals on the air interface of the wireless communications system may be controlled, while supporting a fine velocity resolution and a sufficiently large maximum velocity for a target monitored by the radar operation. It should be appreciated that the air interface may be based on Orthogonal Frequency Division Multiplexing (OFDM) that may be used on the air interface of at least a Long-Term Evolution (LTE) mobile communications system, New Radio (NR) mobile communications system or a mobile communications system beyond 5G or 6G.

A radio device may be a device configured for communications on radio waves over a wireless radio link, i.e. a wireless link. The communications may comprise user traffic and/or signaling. The user traffic may comprise data, voice, video and/or audio. Examples of the wireless link comprise a point-to-point wireless link and a point-to-multipoint wireless link. The wireless link may be provided between two radio devices. It should be appreciated that the radio devices may have differences. For example, radio devices connected by a wireless link may comprise one or more of a user equipment (UE), an access node, an access point, a relay node, a user terminal and an Internet of Things (IoT) device.

A radio device may be a radio access device that is configured to serve a plurality of other radio devices, user radio devices, and give radio access to a communications system for the user radio devices. A radio device may also be a radio station serving as relay node or providing a wireless backhaul for one or more radio access nodes. Examples of the radio access devices comprise at least an access node, an access point, a base station and an (e/g) NodeB. Examples of the user radio devices comprise at least a user terminal and user equipment (UE). The radio device may be an aerial radio device and/or an extraterrestrial radio device configured to operate above the ground without a fixed installation to a specific altitude. Examples of extraterrestrial radio devices comprise at least satellites and spacecraft that are configured for radio communications in a communications system that may comprise both terrestrial and extraterrestrial radio devices. Examples of aerial radio devices comprise at least High Altitude Platform Stations (HAPSs) and unmanned aerial vehicles (UAVs), such as drones. The radio access device may have one or more cells which the user radio devices may connect to in order to access the services of the communications system via the radio access device. The cells may comprise different sizes of cells, for example macro cells, micro cells, pico cells and femto cells. A macro cell may be a cell that is configured to provide coverage over a large coverage area in a service area of the communications system, for example in rural areas or along highways. A micro cell may be a cell that is configured to provide coverage over a smaller coverage area than the macro cell, for example in a densely populated urban area. Pico cells may be cells that are configured to provide coverage over a smaller area than the micro cells, for example in a large office, a mall or a train station. Femto cells may be cells that are configured to provide coverage over a smaller area than the femto cells, for example at homes or small offices. For example macro cells provide coverage for user radio devices passing a city on a motorway/highway and local cells. e.g. micro cells or smaller cells, provide coverage for user radio devices within the city. In another example, macro cells provide coverage for aerial radio devices and/or extraterrestrial radio devices and local cells, e.g, micro cells or smaller cells, provide coverage for the aerial radio devices and/or extraterrestrial radio devices that are located at elevated positions with respect to one or more radio access devices of the communications system. Accordingly, an aerial radio device or extraterrestrial radio device may be connected to a micro cell of a radio access device and when the aerial radio device or extraterrestrial radio device is above a certain height from the ground, the aerial radio device or extraterrestrial radio device may be switched to a macro cell, for example by a handover procedure.

A radar operation comprises a radar transmitting one or more radar excitation signals, i.e. radar signals, within a field of view of the radar. The radar may be a radio device configured to transmit radar excitation signals embedded into a frame structure on an air interface, for example an OFDM frame structure of an OFDM-based air interface. The field of view of the radar may be defined by a direction transmitting the radar signal from the radar. The transmitted radar signal reaches an object, i.e. a target, located within the field of view of the radar after a time 5 of a propagation delay has passed and the radar signal is reflected back from the object to the radar. The radar receives the reflected radar signal after 25 from transmitting the radar signal. If no objects are located within the field of view, the transmitted signal is not reflected back. The time offset between the transmitted and the received reflected signal, the round-trip time, determines the distance to the reflected object. A distance to the object may be expressed by $$D = c\frac{T_R}{2}, \quad (1)$$

where D is the distance, c is speed of light and $T_R$ is the round-trip time from transmitting the radar signal to receiving the radar signal. The radar operation is capable of detecting objects in the field of view from a minimum distance, $d_{min}$, and up to a maximum distance, $d_{max}$, from the radar. Then, a propagation delay will follow $$\frac{d_{min}}{c} \leq \delta \leq \frac{d_{max}}{c}, \quad (2)$$

where c is speed of light and $\delta$ is the propagation delay for the radar signal to reach an object within the field of view. Accordingly, the field of view of the radar satisfies formula (2). Examples of radar signals comprise radar signals that are non-contiguous in time-domain, for example time-domain comb signals, chirp signals, and non-contiguous sequences of OFDM symbols that may comprise user data and/or signaling. The radar signals may be based on Zadoff Chu (ZC)-,m- or gold sequence. Because all of those sequence families already exist in NR UE, radar signals based on ZC-,m- or gold sequence may be implemented in radio devices at least partly based on existing code generators. Moreover, the ZC-,m- or gold sequences have very low cross correlation properties, allowing the simultaneous presence of multiple radar signals in time. Examples of chirp signals that are non-contiguous in time-domain are described in H. Rohling and M. Kronauge, "New radar waveform based on a chirp sequence," 2014 International Radar Conference, Lille, 2014, pp. 1-4. The chirp signals support a low Peak-to-Average power ratio (PAPR) and low-cost implementation. Radar signals comprise non-contiguous radars signals carrying user data and/or signalling may be preferred for efficient utilization of resources on the air interface.

OFDM radar enables joint communication and sensing, J. Fink and F. K. Jondral, "Comparison of OFDM radar and chirp sequence radar," 2015 16th International Radar Symposium (IRS), Dresden, 2015, pp. 315-320. With OFDM Radar, a downlink (DL) signal carrying user data, e.g. OFDM resource elements carrying Quadrature Amplitude Modulation (QAM) symbols, can be used as the radar excitation signal, whereby there is no need to eat away DL capacity for radar operation. The user data may be actual user data or dummy data. On the other hand, also other radar signals may be embedded to the OFDM resource elements using TDM as explained above.

A radar operation of a radio device in a wireless communication system may be performed on the same frequencies that are utilized by the wireless communication system for wireless communications, whereby interference due to uncoordinated radar operation may be a problem for the communications performed in the wireless communication system. Moreover, the frequencies for radar operation may be on unlicensed frequency bands, whereby the radar may cause interference also to other systems as well.

Velocity resolution Av may determine a minimum burst duration for a radar excitation signal according to $c/(2 \Delta v f_c)$, where c denotes the velocity of light, fc denotes the carrier frequency, and the factor 2× is due to the signals travelling from gNB to the target and back.

A radar excitation signal may have a duration and a sampling period. The duration may define a time period or a number of symbols during which the radar excitation signal is transmitted. The radar excitation signal may span over a plurality of frames of a frame structure. The sampling period of the radar excitation signal may be a time spacing between consecutive time units or symbols comprising portions of the radar excitation signal. Therefore, the radar excitation signal may be referred to a non-contiguous radar excitation signal. An example of a radar excitation signal is a sequence of symbols, with a sampling period and a burst duration. Transmission of a radar excitation signal on an air interface may be referred to a burst or radar burst. In an example a radar excitation signal may be embedded into a frame structure for a wireless communications system. The frame structure may comprise time units, where the radar excitation signal may be included. In an example a radar excitation signal may be embedded into a frame structure for Orthogonal Frequency-Division Multiplexed (OFDM) communications. Accordingly, the radar excitation signal may comprise signal portions that are transmitted within time units or at OFDM symbols positions of the frame structure and the signal portions of the radar excitation signal may be spaced in time by one or more time units or OFDM symbols.

A frame structure may comprise consecutive frames for communications on an air interface of a communications system. A frame may comprise time occasions for communications information within time units for example within symbols. A time occasion may be a time slot or a set of time slots. Examples of the symbols comprise OFDM symbols. An example of the frame structure is a frame structure for 5G NR, where a frame has duration of 10 ms which consists of 10 subframes having 1 ms duration each. Each subframe may have 2P time slots, where p is a positive integer according to a transmission numerology. Each time slot may consist of 14 OFDM symbols.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The example of FIG. 1 shows a part of an exemplifying radio access network. FIG. 1 shows user devices 100 and 102 configured to be in a wireless connection on one or more communication channels in a cell with an access node (such as (e/g)NodeB) 104 providing the cell. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point etc. entity suitable for such a usage. The access node provides access by way of communications of radio frequency (RF) signals and may be referred to a radio access node. It should be appreciated that the radio access network may comprise more than one access nodes, whereby a handover of a wireless connection of the user device from one cell of one access node, e.g. a source cell of a source access node, to another cell of another node. e.g. a target cell of a target access node, may be performed.

A communication system typically comprises more than one (e/g)NodeB in which case the (e/g)NodeBs may also be configured to communicate with one another over links, wired or wireless, designed for the purpose. These links may be used for signaling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, wireless device, user radio device, communications device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. The user device may also utilize cloud. In some applications, a user device may comprise a small portable device with radio parts (such as a watch, earphones or eyeglasses) and the computation is carried out in the cloud. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities), CPS may enable the implementation and exploitation of massive amounts of interconnected CT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also being capable of being integrated with existing legacy radio access technologies, such as the LTE.

Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NFV) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a centralized unit, CU 108).

It should also be understood that the distribution of labor between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or NodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano)satellites are deployed). Each satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs or may be a Home(e/g)NodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)Nodes of FIG. 1 may provide any kind of these cells. A cellular radio system may be implemented as a multilayer network including several kinds of cells. Typically, in multilayer networks, one access node provides one kind of a cell or cells, and thus a plurality of (e/g) NodeBs are required to provide such a network structure.

For fulfilling the need for improving the deployment and performance of communication systems, the concept of "plug-and-play" (e/g)NodeBs has been introduced. Typically, a network which is able to use "plug-and-pay" (eg) Node Bs, includes, in addition to Home (e/g)NodeBs (H(e/g)NodeBs), a home node B gateway, or HNB-GW (not shown in FIG. 1). A HNB Gateway (HNB-GW), which is typically installed within an operator's network may aggregate traffic from a large number of HNBs back to a core network.

The embodiments are not, however, restricted to the system given as an example but a person skilled in the art may apply the solution to other communication systems provided with necessary properties.

Figure 2:
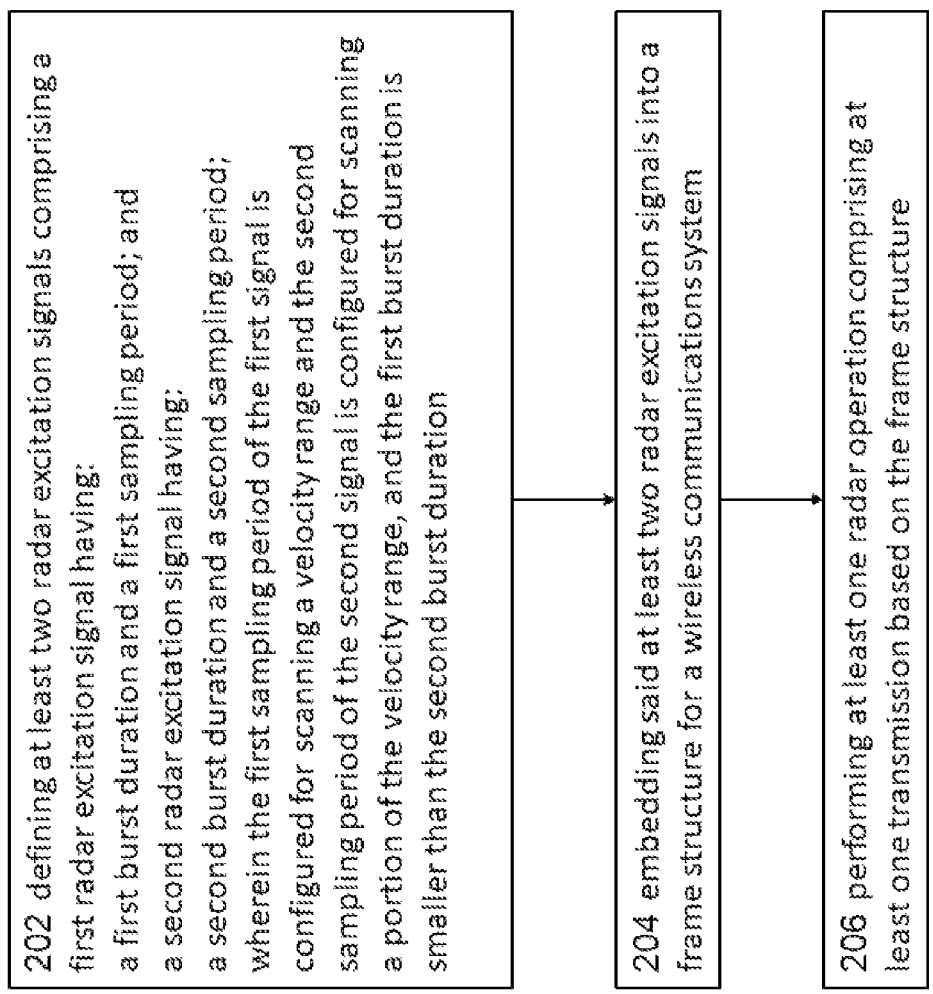
FIGS. 2 and 3 illustrate examples of methods in accordance with at least some embodiments of the present invention.

Referring to FIG. 2, there is provided an example of a method for controlling overhead of radar excitation signals in an OFDM-based communications system, while supporting a fine velocity resolution and a sufficiently large maximum velocity for a target monitored by a radar operation in accordance with at least some embodiments of the present invention. In an example the method may be performed at a radio access device, for example gNB.

Phase 202 comprises defining at least two radar excitation signals comprising a first radar excitation signal having: a first burst duration and a first sampling period; and a second radar excitation signal having: a second burst duration and a second sampling period; wherein the first sampling period of the first radar excitation signal is configured for scanning a velocity range and the second sampling period of the second radar excitation signal is configured for scanning a portion of the velocity range, and the first burst duration is smaller than the second burst duration. It should be appreciated that the first/second radar excitation signal, first/second burst duration and first/second sampling period are intended to distinguish a radar excitation signal, burst duration and sampling period between another one. Therefore, they could be named otherwise too. It should be appreciated that this naming convention is applied throughout this document.

Phase 204 comprises embedding said at least two radar excitation signals into a frame structure for a wireless communications system.

In an example phase 202 comprises that the radar excitation signals may be transmitted on a plurality of beams and the radar excitation signals may carry user data, if there is at least one user that can be served by a beam, where the radar excitation signals are transmitted. For this to happen it is advantageous to have an air interface capable to schedule a user on multiple beams. e.g. on the best beam and on the second best beam as measured and reported by the user. This will strongly increase the probability that at least one user can be served with data on any particular beam direction.

In an example in accordance with at least some embodiments, phase 204 comprises that the frame structure is for Orthogonal Frequency-Division Multiplexed (OFDM) communications. The frame structure for OFDM communications comprises frames, where OFDM symbols are arranged in time slots.

In an example, phase 204 comprises that the radar excitation signals are transmitted within time units of the frame structure or at symbol positions of OFDM symbols of the frame structure.

In an example, phase 204 comprises adapting Fast Fourier Transform (FFT) processing by selecting larger FFT size together with zero padding for OFDM symbols not allocated for Radar excitation.

Phase 206 comprises performing at least one radar operation comprising at least transmission based on the frame structure.

In an example in accordance with at least some embodiments, phase 206 comprises that the transmission is based on a frame structure for OFDM communications.

In an example in accordance with at least some embodiments, phase 202 comprises defining the velocity resolution of the second radar excitation signal to meet the velocity resolution for measuring a velocity of a target by said at least two radar excitation signals.

In an example of the sampling periods of the radar excitation signals, the radar excitation signals may have an equal to or a higher sampling period than a symbol duration T for OFDM symbols in a frame structure for OFDM communications. With sampling period T and M samples over burst duration MT, after Fourier transform the frequency range is given by 1/T (more precisely, the discrete frequencies are given by 0, 1/MT, . . . (M−1)/MT) and the frequency resolution by 1/MT. By increasing the sampling period to mT (integer m>1), the number of samples within the same burst duration MT is reduced to M/m, the frequency range is reduced to 1/mT, and the frequency resolution 1/MT is unchanged.

In an example in accordance with at least some embodiments, phase 204 comprises applying a deterministic scheduling to the first radar excitation signal and an opportunistic scheduling to the second radar excitation signal. Applying different scheduling for the radar excitation signals provides mitigating overhead by the radar excitation signals. In an example, applying a deterministic scheduling comprises performing a periodic beam sweeping operation. In an example, applying an opportunistic scheduling comprises performing a radar operation, when scheduling user data to one or more active users. Accordingly, user data transmissions may serve as the radar excitation signal. For example, radar excitation signals may be used to carry user data over an OFDM-based air interface. If the radar excitation signals are transmitted on a (narrow) beam, data can be transmitted to a user if the user is able to "see" that beam. Otherwise dummy data signals may be used for radar excitation, or any other signal, e.g. those mentioned above.

Beam sweeping may comprise that a signal is sent via all beams, one beam at a time. Once the signal has been sent via all the beams, the beam sweeping may be repeated, for example, periodically. Beam sweeping using the radar excitation signals comprises that each of the radar excitation signals is sent via all beams, one beam at a time. The order of transmission of the radar excitation signals over the beams can be arranged in multiple ways, provided the latency is acceptable e.g. 50-100 ms so that a monitored target is not moving too much. In an example, an order for transmission of the radar excitation signals is transmitting signal 1 via beam 1, signal 2 via beam 1, signal 1 via beam 2, signal 2 via beam 2. Another example is transmitting signal 1 via beam 1, signal 1 via beam 2, signal 2 via beam 1, signal 2 via beam 2. It should be appreciated that a full beam sweep can also be partitioned into multiple partial beam sweeps, over multiple subsets of beams. In this way, a beam sweep may be performed for one subset and only after the beam sweep for the one subset is complete, a next beam sweep for another subset is performed. The above examples of beam sweeping refer to examples for analog beamforming, where transmissions are performed one beam at a time. It should be appreciated that, if digital or hybrid beamforming is used, there may be multiple beams at a time. However, in such a case transmission power may be shared among the beams, which may cause additional range limitation for the radar.

In an example in accordance with at least some embodiments, phase 206 comprises performing one beam sweep with at least part of one of the radar excitation signals and performing another beam sweep with at least part of another one of the radar excitation signals. The beam sweeps may comprise at least partly different beams. In an example a set of beams for a beam sweep using at least part of the radar excitation signal, e.g. second radar excitation signal, configured for scanning a portion of the velocity range may be a subset of the beams for the beam sweep using at least part of the radar excitation signal, e.g. first radar excitation signal, configured for scanning a velocity range. The first radar excitation signal may provide a coarse velocity resolution and the second radar excitation signal may provide a fine granular velocity resolution. A beam sweep may comprise using at least some symbol(s) of a radar excitation signal.

In an example in accordance with at least some embodiments, phase 206 comprises transmitting the radar excitation signals consecutively in time or interleaved in time.

In an example in accordance with at least some embodiments, phase 206 comprises multiplexing transmissions of the radar excitation signals on different beams. Interleaving supports mitigating overhead by the radar excitation signals. On the other hand consecutive radar excitation signals may support fast beam sweeping.

In an example in accordance with at least some embodiments, phase 204 comprises that at least one time unit in the frame structure is shared by the at least two radar excitation signals. In this way mitigating overhead by the radar excitation signals is supported.

In an example in accordance with at least some embodiments, phase 204 comprises that the time unit is an OFDM symbol or an OFDM symbol duration.

In an example in accordance with at least some embodiments, phase 204 comprises that a position of the shared OFDM symbol is defined in bursts of the at least two radar excitation signals. In an example the shared time unit or OFDM symbol may be at the beginning of the bursts. On the other hand, if velocity of a monitored target would have rapid changes, sharing the time unit or OFDM symbol in the middle of the burst (i.e. placing the short sequence in the middle of the long sequence) could provide more accurate measurement results.

In an example in accordance with at least some embodiments, phase 204 comprises that one or more of the at least two radar excitation signals comprise user data or signaling.

Figure 3:
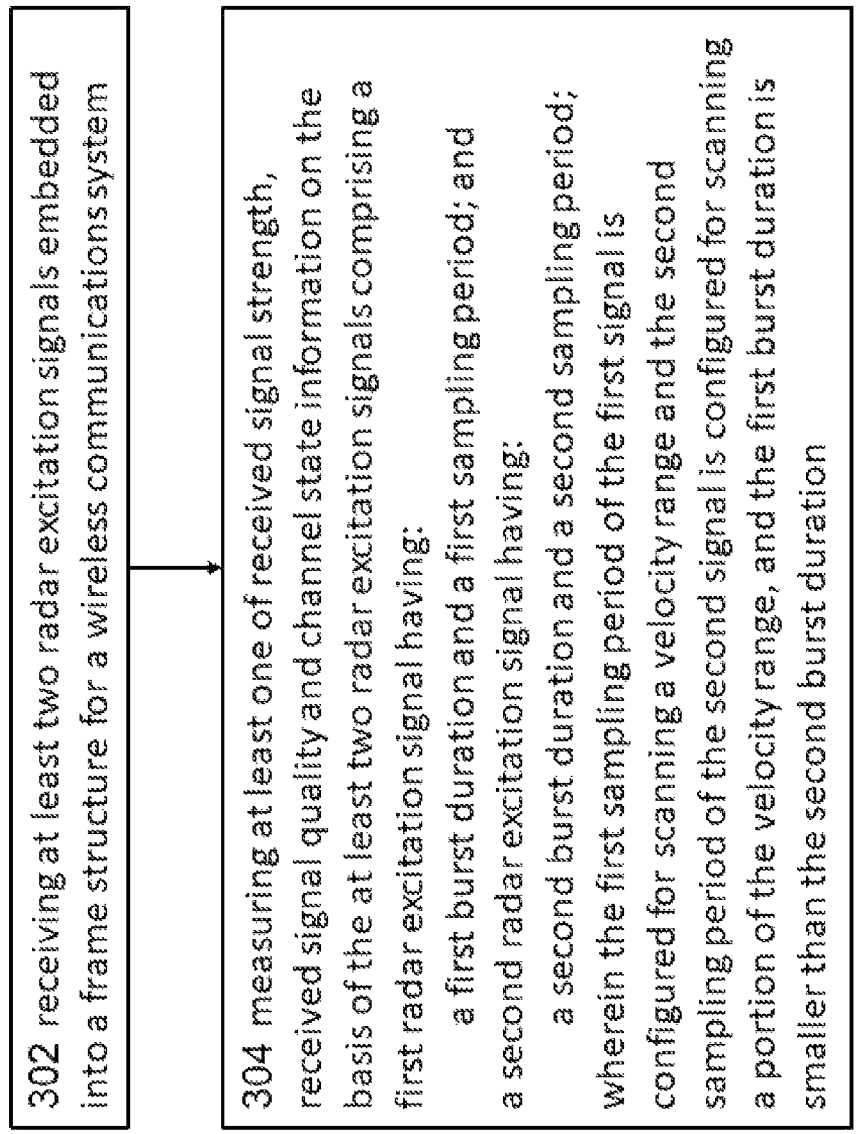

Referring to FIG. 3, there is provided an example of a method for supporting measurements by a radar operation in accordance with at least some embodiments of the present invention. The method may be performed by at a user radio device, for example a UE. The UE may be within a range of communications with a gNB operating in accordance with the method described with FIG. 2.

Phase 302 comprises receiving at least two radar excitation signals embedded into a frame structure for a wireless communications system.

Phase 304 comprises measuring at least one of received signal strength, received signal quality and channel state information on the basis of the at least two radar excitation signals comprising a first radar excitation signal having: a first burst duration and a first sampling period; and a second radar excitation signal having: a second burst duration and a second sampling period; wherein the first sampling period of the first radar excitation signal is configured for scanning a velocity range and the second sampling period of the second radar excitation signal is configured for scanning a portion of the velocity range, and the first burst duration is smaller than the second burst duration. In this way the radar excitation signals support UE measurements. The UE measurements may be transmitted in measurements reports to a radio access device.

In an example in accordance with at least some embodiments, phase 302 comprises that the frame structure is for Orthogonal Frequency-Division Multiplexed (OFDM) communications. The frame structure for OFDM communications comprises frames, where OFDM symbols are arranged in time slots.

In an example, phase 302 comprises that the radar excitation signals are received within time units of the frame structure or at symbol positions of OFDM symbols of the frame structure.

An example of radar excitation signals for OFDM is next described for application of NR gNB as an OFDM radar for traffic monitoring. The example utilizes a principle of the NR gNB using at least two different signals for radar excitation. The radar excitation signals used in the example comprise two differently parametrized time-domain comb signals.

System setup for the NR gNB is characterized by:
28 GHz carrier frequency,
64 antennas/orthogonal beams with analog beam-steering,
120 kHz subcarrier spacing, i.e. 0.125 ms slot duration,
Normal Cyclic Prefix, i.e. 14 symbols/slot.

In this system setup, typically a beam sweep in time-domain will be applied to send out the radar excitation signals, one beam at a time due to analog beamforming, one beam after another. Although the radar excitation signals may carry data, the data transfer is limited to the subset of users that can be reached with the (narrow) active beam. This limitation motivates to reduce overhead for excitation signals also in case of OFDM radar.

An example of a typical signal processing for OFDM radar is a two-dimensional Fourier transform to compute a periodogram with N columns and M rows, where N denotes the number of active sub-carriers and M the number of OFDM symbols carrying the radar excitation signals. In the obtained periodogram, the maximum position column-wise relates to the distance of the target (i.e. delay of the echo signal), and row-wise to the target velocity (i.e. Doppler shift of the echo signal). A characteristic of OFDM radar is that the determination of distance and velocity are completely independent (as opposed to constant envelope radar where both properties depend on each other). The periodogram benefits from an improvement of the SNR by a factor N×M versus the SNR at the receive antenna, called the processing gain.

The traffic monitoring use case is described with the following requirements for a radar operation for monitoring a target:
1 m distance resolution,
100 m range,
10 km/h velocity resolution,
280 km/h maximum velocity.

In a conventional OFDM radar, a burst duration of about 1.93 ms would be required with above system setup to achieve a velocity resolution of 10 km/h, i.e. the required measurement duration would span about 16 slots. With 64 beams, if each beam would be allocated over 2 ms for radar processing, the procedure would have to be repeated after 128 ms, since the target may move significantly within that period, e.g. by about 10 m at 280 km/h, by far exceeding the minimum required distance resolution. In this scenario the entire DL radio resources would be occupied with radar excitation signals with a new beam sweep every 128 ms.

The maximum unambiguous velocity is given by $c/(2 f_c T_0)$, where $T_0$ denotes the total OFDM symbol duration including Cyclic Prefix, under the typical assumption that M consecutive OFDM symbols are processed. With time-non-contiguous signals, the maximum unambiguous velocity is given by $c/(2 f_c mT_0)$, where $mT_0$ (m integer) is the sampling period given by an integer multiple of the total OFDM symbol duration. With the above system setup, up to about 2160 km/h target velocity could be measured without ambiguity, which is more than sufficient for the traffic monitoring use case.

The traffic monitoring is provided by the two differently parametrized time-domain comb signals comprising a first radar excitation signal and a second radar excitation signal. Based on the first radar excitation signal, a first velocity measurement is provided with coarse velocity resolution, e.g. $\Delta v1=70$ km/h, but spanning the entire velocity range, e.g. up to 280 km/h (=4×70 km/h). Based on the second radar excitation signal, a second velocity measurement is provided with fine velocity resolution, e.g. $\Delta v2=10$ km/h resolution, and (at least) spanning a velocity range given by the velocity resolution of the first radar excitation signal, e.g. v2,max=70 km/h (≥Δv1).

The resulting impact on the signal parametrization is as follows:

- Each of the time-domain comb signals is a series of consecutive signal portions that are spaced in time, i.e. the time-domain comb signals are non-contiguous in time-domain, thereby forming respective time-domain combs. A time-domain comb is characterized by its spacing $mT_0$ ($m \geq 1$ integer), where $T_0$ denotes the symbol duration. The spacing $mT_0$ corresponds to the sampling interval for computing the rows of the periodogram.
- One of the time-domain comb signals, i.e. a first signal, is parametrized to have a short burst duration (i.e. shorter than needed to achieve the required velocity resolution) and short sampling interval, i.e. the time-domain spacing in number of symbol durations $mT_0$ is sufficiently short for scanning the entire velocity range up to the required maximum velocity.
- One of the time-domain comb signals, i.e. a second signal, is parametrized to have a sufficiently long burst duration to achieve the required velocity resolution but is rather sparse in time, i.e. the spacing is too large for scanning the entire velocity range up to the required maximum velocity. But the sampling interval must be sufficiently short for scanning (at least) the velocity range given by the velocity resolution of the first signal.

In an example in accordance with at least some embodiments, a method comprises measuring a first velocity, $v_1$, of on the basis of the first radar excitation signal; measuring a second velocity, $v_2$, on the basis of the second radar excitation signal; determining at least one condition for a third velocity on the basis of the first velocity; deriving the third velocity based on the second velocity and the at least one condition. In this way monitoring of targets e.g. traffic, may be supported by the radar signals. In an example the first velocity may be a coarse velocity defined by Formula (3), the second velocity may be a fine granular velocity defined by Formula (4), the third velocity may be defined by formula (5) and the at least condition may be defined by formula (6).

A velocity measurement by the first radar excitation signal gives:

$$v_1 = m_1 \Delta v_1 (m_1 \in \{0, 1, \ldots, M_1 - 1\}) \quad (3).$$

A velocity measurement by the second radar excitation signal gives:

$$v_2 = m_2 \Delta v_2 (m_2 \in \{0, 1, \ldots, M_2 - 1\}) \quad (4).$$

In Formulas (3) and (4), $m_1$ and $m_2$ may denote the row-wise maximum positions of the two periodograms. A possible method for combining the measurements is similar as described in H. Rohling and M. Kronauge, "New radar waveform based on a chirp sequence," 2014 International Radar Conference, Lille, 2014, pp. 1-4, for a different technique using a chirp-based waveform. The final velocity measurement may be given by:

$$v = v_2 + q \, v_{2,max} \quad (5).$$

where integer $q \geq 0$ is selected to find at least a local minimum of an absolute value of:

$$v - v_1 \quad (6).$$

In other words, the final velocity measurement v may be given by adding to the fine-granular velocity estimate $v_2$ a multiple of q times the maximum velocity $v_{2,max}$, where q is chosen such that v is closest to the coarse velocity measurement $v_1$, In practice the combining may be a bit more involved to be sufficiently accurate.

Example

The periodogram computed based on the first radar excitation signal has its maximum position at $m_1=1$, i.e. the target velocity obtained with the first measurement is 70 km/h within +/−35 km/h.

The periodogram computed based on the second radar excitation signal has its maximum position at $m_2=2$, i.e. the target velocity obtained with the second measurement is 20 km/h within +/−5 km/h.

By scanning over integer q, the combining would find v=20 km/h with q=0, v=90 km/h with q=1, v=160 km/h with q=2, etc.

The final velocity measurement will be selected as v=90 km/h (q=1), so that the result is within the range of the first coarse measurement given by 70 km/h+/−35 km/h. The final measurement result has a resolution of 10 km/h as required.

In the example of the traffic monitoring, a velocity, i.e. a first velocity, of the target may be measured by computing a periodogram using the first radar excitation signal. The periodogram may have its maximum position at $m_1=1$, whereby the velocity of the target obtained with the first radar excitation signal is 70 km/h within +1-35 km/h. A velocity. i.e. a second velocity, of the target may be measured by computing a periodogram using the second radar excitation signal. The periodogram may have its maximum position at m2=2, whereby the velocity of the target obtained with the second radar excitation signal is 20 km/h within +/−5 km/h. The velocity of the target may be calculated by scanning over different values of integer q in accordance with formula (5) for satisfying a condition in accordance with the Formula (6). Accordingly, scanning over different values of integer q gives v=20 km/h with q=0, v=90 km/h with q=1, v=160 km/h with q=2, etc. The velocity of the target may be selected as v=90 km/h (q=1), so that the result is closest to the first coarse measurement given by 70 km/h+/−35 km/h in accordance with Formula (6). Velocity resolution of the velocity of the target determined in this way has a resolution of 10 km/h as required.

FIG. 4 illustrates examples of radar excitation signals in accordance with at least some embodiments of the present invention. An example of a radar excitation signal may be a sequence of OFDM symbols 402 that may comprise user data and/or signaling. The sequence of OFDM symbols may have a symbol duration T0 and the sampling period of the sequence may be mT0, which defines spacing of the OFDM symbols in time such that the sequence is non-contiguous for comb-shaped structure. Another example of a radar excitation signal may be a chirp-based comb signal 404. The chirp-based comb signal may have a chirp duration Tc and the sampling period of the chirp may be mTc, which defines spacing of the chirps in time for comb-shaped structure of the chirp-based signal. Consecutive chirps may be separated by a time period during which the chirp is switched off.

Figure 5:
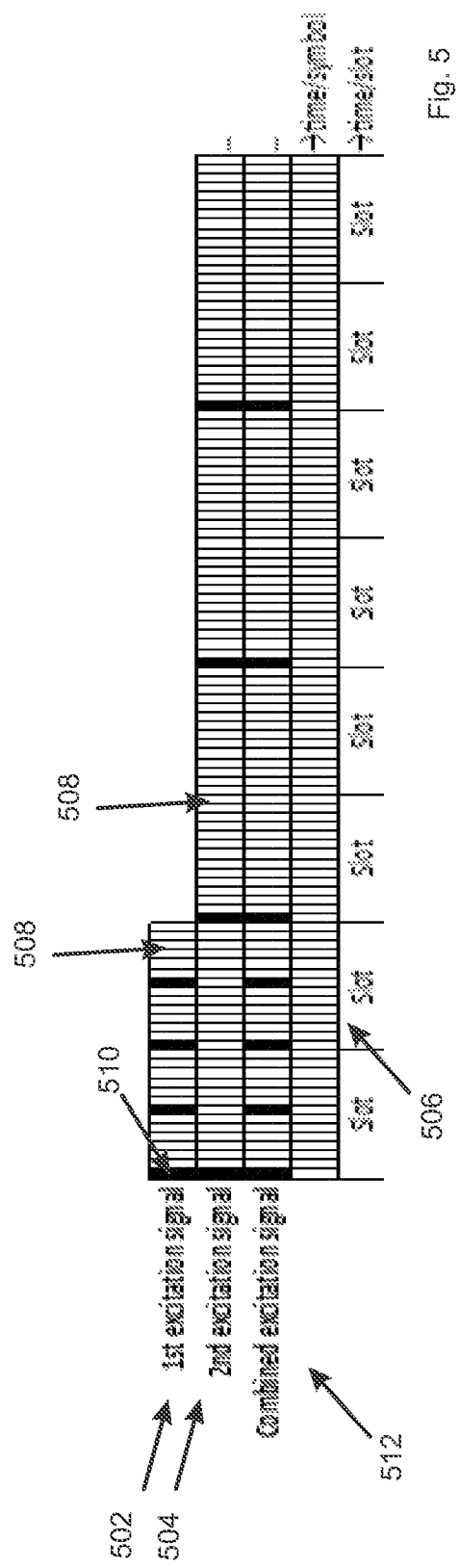
FIG. 5 illustrates examples of bursts of radar excitation signals in accordance with at least some embodiments of the present invention.

FIG. 5 illustrates examples of bursts of radar excitation signals in accordance with at least some embodiments of the present invention. Radar excitation signals 502, 504 are illustrated embedded in a frame structure for OFDM communications. The frame structure may be for 5G NR, where a frame has duration of 10 ms which consists of 10 subframes having 1 ms duration each. Each subframe may have $2^\mu$ slots 506, where μ is a positive integer according to a transmission numerology. Each slot may consist of 14

OFDM symbols 508. Although in FIG. 5, a fist OFDM symbol of a time slot 506 is allocated to a radar excitation signal it should be appreciated that it does not necessarily have to be the first OFDM symbol of the time slot, but in principle any symbol-offset can be applied. A combined radar excitation signal 512 illustrates an overhead caused by the radar excitation signals 502, 504 in an OFDM transmission based on the frame structure comprising the at least two radar excitation signals. The overhead caused by the combined radar excitation signal 512 is less than if two separate radar excitation signals 502, 504 were used.

In an example, in accordance with at least some embodiments radar excitation signals are transmitted consecutively in time or interleaved in time. For example the radar excitation signals 502, 504 may be arranged to the frame structure at least partially interleaved in time. In this way the radar excitation signals may be transmitted interleaved in time and overhead caused by the radar excitation signals may be mitigated as can be seen from the combined excitation signal. It should be appreciated that alternatively or additionally, the radar excitation signals 502, 504 may be arranged consecutively to the frame structure for OFDM communications. In this way, the radar excitation signals may be transmitted consecutively in time. However, in this case the overhead may be higher than if the radar excitation signals would be transmitted at least partially interleaved in time. The overhead may be reduced if symbols are shared by the interleaving. In at least one example, in accordance with at least some embodiments at least one OFDM symbol 510 in the frame structure is shared by at least two radar excitation signals 502, 504. It should be appreciated that also more than one, for example all but one, or less, OFDM symbols may be shared by the radar excitation signals. In an example, in accordance with at least some embodiments, radar excitation signals 502, 504 may be multiplexed on different beams. In this way the radar excitation signals in the frame structure may be transmitted by different beams. In an example, a beam sweep may be performed using the radar excitation signals, whereby the radar excitation signals are transmitted on each beam. As the second excitation signal 504 is comparatively sparse in time, it enables to scan a rather large number of beams within the burst duration. When having a limited capacity per time slot for radar excitation, for a full beam sweep it may be preferred in terms of speed if the (beam sweeps with) excitation signals 502, 504 are consecutive in time.

It should be appreciated that a full beam sweep is needed to compute a full three-dimensional (3D) radar image: range, velocity and angle. A fixed overhead for radar excitation, e.g. two symbols per slot, may be reserved. The radar excitations signals may be arranged to the same beam consecutively. In this way time interleaving may be provided for multiple beams within the burst duration. This may save overhead for the beam sweep, as compared to using the combined signal 512 on each beam.

In an example, in accordance with at least some embodiments, a position of the shared OFDM symbol 510 maybe defined in bursts of the at least two radar excitation signals. In the example illustrated in FIG. 5, only a single OFDM symbol is shared when combining the first and second excitation signal 502, 504; 11 symbols are allocated with the combined signal 512 versus 12 symbols with separate signals. Therefore, advantageously the time for transmitting the excitation signals can be reduced, e.g. 18 slots would be required for consecutive transmission, while only 16 slots are required with signal combining or time-Interleaving.

An exemplary signal parametrization for radar excitation signals is provided in the following to illustrate potential efficiency gains of examples according to embodiments. Further optimization by different parametrization, e.g. by thinning out the second excitation signal further, may be possible. The example is described with reference to the radar excitation signals 502, 504 in FIG. 5.

With time-non-contiguous signals, the maximum unambiguous velocity is given by $c/(2\, f_c\, mT_0)$, where $mT_0$ (m integer) is the sampling period given by an integer multiple of the total OFDM symbol duration. Table 1 depicts the maximum unambiguous target velocity versus the sampling period in number of OFDM symbols with 0.125 ms slot duration and 14 symbols/slot. Using Table 1, the system requirements can be fulfilled by parameterizing the radar excitation signals as follows:

The first excitation signal is a time-domain comb present in every $7^{th}$ OFDM symbol (i.e. every half-slot) and provides a maximum unambiguous target velocity of 309 km/h.

The second excitation signal is a time-domain comb present in every $28^{th}$ OFDM symbol (i.e. every second slot) and provides a maximum unambiguous target velocity of 77 km/h (~309 km/h/4).

TABLE 1

Maximum unambiguous target velocity versus sampling period in number of OFDM symbols.

| Sampling period (# symbols) | vmax (km/h) | Usage |
|---|---|---|
| 1 | 2160 | |
| 2 | 1080 | |
| 7 | 309 | 1st excitation signal |
| 14 | 154 | |
| 28 | 77 | 2nd excitation signal |

The (minimum) burst duration of the excitation signals can be derived from Table 2:

The first excitation signal shall provide a velocity resolution of 77 km/h, this is the maximum target velocity supported by the second excitation signal. The first excitation signal requires about 0.25 ms burst duration. Since the spacing of the comb signal is 7 symbols, the number of samples within a burst is given by $M_1=4$.

The second excitation signal shall provide a velocity resolution of 10 km/h, this is the velocity resolution required for the radar system. The second excitation signal requires about 2 ms burst duration. Since the spacing of the comb signal is 28 symbols, the number of samples within a burst is given by $M_2=8$.

TABLE 2

Burst duration and number of samples of the two radar excitation signals.

| Signal | Velocity resolution (km/h) | Burst duration (ms) | Burst duration (slots) | #samples M |
|---|---|---|---|---|
| 1st excitation signal | 77 | 0.25 | 2 | 4 |
| 2nd excitation signal | 10 | 1.93 | 16 | 8 |

The resulting time-domain comb signals for the first and second excitation signal are exemplified in the first and second row of FIG. 5, respectively.

An assessment of overhead reduction of the time-domain comb signals according to Table 2 and FIG. 5:

The time-domain comb signals require 12 OFDM symbols over 18 slots when arranged consecutively, or 11 symbols over 16 slots with combining.

A conventional design with time-contiguous excitation signal over 16 slots would occupy 224 symbols (14 symbols/slot×16 slots).

A conventional design with time-non-contiguous excitation signal over 16 slots with every $7^{th}$ symbol allocated would require 32 symbols (2 symbols/slot×16 slots).

Resource saving of the time-domain comb signals is therefore about 18.7× versus conventional time-contiguous design and about 2.67× versus conventional non-time-contiguous design.

A further advantage of time-domain comb signals is that (with fixed overhead for the radar excitation signals) it makes the beam sweep faster as compared to the conventional design:

Let's assume that two OFDM symbols per slot are allocated for radar excitation and 64 beams need to be scanned, one at a time.

Conventional comb signal with every $7^{th}$ symbol allocated would require 128 ms for a full sweep, since the beam multiplexing capability is limited to one beam within 2 ms burst duration.

With our example design and with consecutive transmission of the first and second excitation signals, a full beam sweep takes only 50 ms:
- 16 ms with the first excitation signal (1 beam multiplexed within 0.25 ms burst, 64 times),
- 34 ms with the second excitation signal (4 beams multiplexed within 2.125 ms burst, 16 times).

Our example design reduces the time needed for a full beam sweep by 2.56× (128 ms→50 ms) versus conventional non-time-contiguous design, similar as with the resource saving.

The above assessment assumed that there is sufficient processing gain with any of the designs. To give an example, a distance resolution of 1 m would require a minimum bandwidth of 150 MHz, corresponding to 1250 active subcarriers at 120 kHz SCS. In our example design, the processing gain would be about 37 dB and 40 dB for the first and second excitation signal, respectively, if all 1250 subcarriers would be allocated. In other words, the processing gain is quite large also when using low overhead signal design; spending 2.67× more OFDM symbols would improve SNR by ~4.3 dB which is small, given the actual processing gain.

Figure 6:
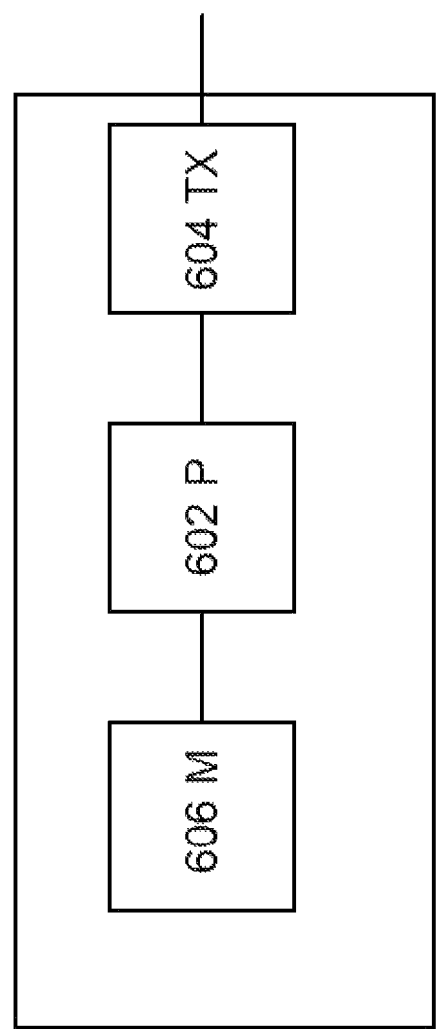
FIG. 6 illustrates an apparatus in accordance with at least some embodiments of the present invention.

FIG. 6 illustrates an example of an apparatus in accordance with at least some embodiments of the present invention. The apparatus may be a radio device, for example a radio access node or a user radio device. The apparatus may perform one or more functionalities according to examples described herein.

The apparatus comprises a processor (P) 602 and a transceiver (TX) 604. The processor is operatively connected to the transceiver for controlling the transceiver. The apparatus may comprise a memory (M) 606. The memory may be operatively connected to the processor. It should be appreciated that the memory may be a separate memory or included to the processor and/or the transceiver.

According to an embodiment, the processor is configured to control the transceiver to perform one or more functionalities described according to an embodiment.

A memory may be a computer readable medium that may be non-transitory. The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs) and processors based on multi-core processor architecture, as non-limiting examples.

Embodiments may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any media or means that can contain, store, communicate, propagate or transport the instructions for use by or in connection with an instruction execution system, apparatus, or device, such as a computer.

Reference to, where relevant, "computer-readable storage medium", "computer program product", "tangibly embodied computer program" etc., or a "processor" or "processing circuitry" etc. should be understood to encompass not only computers having differing architectures such as single/multi-processor architectures and sequencers/parallel architectures, but also specialized circuits such as field programmable gate arrays FPGA, application specify circuits ASIC, signal processing devices and other devices. References to computer readable program code means, computer program, computer instructions, computer code etc. should be understood to express software for a programmable processor firmware such as the programmable content of a hardware device as instructions for a processor or configured or configuration settings for a fixed function device, gate array, programmable logic device, etc.

Although the above examples describe embodiments of the invention operating within a user radio device, UE, radio access device or a gNB, it would be appreciated that the invention as described above may be implemented as a part of any apparatus comprising a circuitry in which radio frequency signals are transmitted and/or received. Thus, for example, embodiments of the invention may be implemented in a mobile phone, in a base station, in a radio station, in a user radio device, in a computer such as a desktop computer or a tablet computer comprising radio frequency communication means (e.g. wireless local area network, cellular radio, etc.).

In general, the various embodiments of the invention may be implemented in hardware or special purpose circuits or any combination thereof. While various aspects of the invention may be illustrated and described as block diagrams or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As used in this application, the term 'circuitry' may refer to one or more or all of the following:
(a) hardware-only circuit implementations (such as implementations in only analogue and/or digital circuitry) and
(b) combinations of hardware circuits and software, such as (as applicable):
(i) a combination of analogue and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

EXAMPLES 1 TO 55

Example 1: A method comprising:
defining at least two radar excitation signals comprising a first radar excitation signal having:
a first burst duration and a first sampling period; and
a second radar excitation signal having:
a second burst duration and a second sampling period;
wherein the first sampling period of the first radar excitation signal is configured for scanning a velocity range and the second sampling period of the second radar excitation signal is configured for scanning a portion of the velocity range, and the first burst duration is smaller than the second burst duration;
embedding said at least two radar excitation signals into a frame structure for a wireless communications system; and
performing at least one radar operation comprising at least one transmission based on the frame structure.

Example 2: The method according to example 1, comprising:
defining the velocity resolution of the second radar excitation signal to meet the velocity resolution for measuring a velocity of a target by said at least two radar excitation signals.

Example 3: The method according to example 1 or 2, comprising:
measuring a first velocity of on the basis of the first radar excitation signal;
measuring a second velocity on the basis of the second radar excitation signal;
determining at least one condition for a third velocity on the basis of the first velocity;
deriving the third velocity based on the second velocity and the at least one condition.

Example 4: The method according to any of the preceding examples, comprising:
performing a first beam sweep with at least part of the first radar excitation signal and performing a second beam sweep with at least part of the second radar excitation signal, wherein the first beam sweep comprises a first set of beams and the second beam sweep comprises a second set of beams, wherein the first set of beams and the second set of beams comprise at least partly different beams.

Example 5: The method according to any of the preceding examples, comprising:
applying a deterministic scheduling to the first radar excitation signal and an opportunistic scheduling to the second radar excitation signal.

Example 6: The method according to any of the preceding examples, comprising:
transmitting the radar excitation signals consecutively in time or interleaved in time.

Example 7: The method according to any of the preceding examples, comprising:
multiplexing transmissions of the radar excitation signals on different beams.

Example 8: The method according to any of the preceding examples, wherein at least one time unit in the frame structure is shared by the at least two radar excitation signals.

Example 9: The method according to example 8, wherein a position of the shared time unit is defined in bursts of the at least two radar excitation signals.

Example 10: The method according to any of the preceding examples, wherein at least one of the at least two radar excitation signals comprise user data or signaling.

Example 11: A method comprising:
receiving at least two radar excitation signals embedded into a frame structure for a wireless communications system;
measuring at least one of received signal strength, received signal quality and channel state information on the basis of the at least two radar excitation signals comprising a first radar excitation signal having:
a first burst duration and a first sampling period; and
a second radar excitation signal having:
a second burst duration and a second sampling period;
wherein the first sampling period of the first radar excitation signal is configured for scanning a velocity range and the second sampling radar excitation period of the second signal is configured for scanning a portion of the velocity range, and the first burst duration is smaller than the second burst duration.

Example 12: An apparatus comprising:
means for defining at least two radar excitation signals comprising a first radar excitation signal having:
a first burst duration and a first sampling period; and
a second radar excitation signal having:
a second burst duration and a second sampling period;
wherein a first sampling period of the first radar excitation signal is configured for scanning a velocity range and a second sampling period of the second radar excitation signal is configured for scanning a portion of the velocity range, and the first burst duration is smaller than the second burst duration;
means for embedding said at least two radar excitation signals into a frame structure for a wireless communications system; and
means for performing at least one radar operation comprising at least one transmission based on the frame structure.

Example 13: The apparatus according to example 12, comprising:
means for defining the velocity resolution of the second radar excitation signal to meet the velocity resolution for measuring a velocity of a target by said at least two radar excitation signals.

Example 14: The apparatus according to example 12 or 13, comprising:

means for measuring a first velocity of on the basis of the first radar excitation signal;

means for measuring a second velocity on the basis of the second radar excitation signal;

means for determining at least one condition for a third velocity on the basis of the first velocity;

means for deriving the third velocity based on the second velocity and the at least one condition.

Example 15: The apparatus according to any of examples 12 to 14, comprising:

means for performing a first beam sweep with at least part of the first radar excitation signal and performing a second beam sweep with at least part of the second radar excitation signal, wherein the first beam sweep comprises a first set of beams and the second beam sweep comprises a second set of beams, wherein the first set of beams and the second set of beams comprise at least partly different beams.

Example 16: The apparatus according to any of examples 12 to 15, comprising:

means for applying a deterministic scheduling to the first radar excitation signal and an opportunistic scheduling to the second radar excitation signal.

Example 17: The apparatus according to any of examples 12 to 16, comprising:

means for transmitting the radar excitation signals consecutively in time or interleaved in time.

Example 18: The apparatus according to any of the preceding examples, comprising:

means for multiplexing transmissions of the radar excitation signals on different beams.

Example 19: The apparatus according to any of examples 12 to 18, wherein at least one time unit in the frame structure is shared by the at least two radar excitation signals.

Example 20: The apparatus according to example 19, wherein a position of the shared time unit is defined in bursts of the at least two radar excitation signals.

Example 21: The apparatus according to any of examples 12 to 20, wherein at least one of the at least two radar excitation signals comprise user data or signaling.

Example 22: An apparatus comprising at least one processor; and at least one memory including computer program code; the at least one memory and the computer program code configured to, with the at least one processor, to cause the apparatus to:

define at least two radar excitation signals comprising a first radar excitation signal having:
a first burst duration and a first sampling period; and
a second radar excitation signal having:
a second burst duration and a second sampling period;
wherein the first sampling period of the first radar excitation signal is configured for scanning a velocity range and the second sampling period of the second radar excitation signal is configured for scanning a portion of the velocity range, and the first burst duration is smaller than the second burst duration;
embed said at least two radar excitation signals into a frame structure for a wireless communications system; and
perform at least one radar operation comprising at least one transmission based on the frame structure.

Example 23: The apparatus according to example 22, wherein the computer program code is configured to, with the at least one processor, to cause the apparatus to:
define the velocity resolution of the second radar excitation signal to meet the velocity resolution for measuring a velocity of a target by said at least two radar excitation signals.

Example 24: The apparatus according to example 22 or 23, wherein the computer program code is configured to, with the at least one processor, to cause the apparatus to:
measure a first velocity of on the basis of the first radar excitation signal;
measure a second velocity on the basis of the second radar excitation signal;
determine at least one condition for a third velocity on the basis of the first velocity;
derive the third velocity based on the second velocity and the at least one condition.

Example 25: The apparatus according to any of examples 22 to 24, wherein the computer program code is configured to, with the at least one processor, to cause the apparatus to:
perform a first beam sweep with at least part of the first radar excitation signal and performing a second beam sweep with at least part of the second radar excitation signal, wherein the first beam sweep comprises a first set of beams and the second beam sweep comprises a second set of beams, wherein the first set of beams and the second set of beams comprise at least partly different beams.

Example 26: The apparatus according to any of examples 22 to 25, wherein the computer program code is configured to, with the at least one processor, to cause the apparatus to:
apply a deterministic scheduling to the first radar excitation signal and an opportunistic scheduling to the second radar excitation signal.

Example 27: The apparatus according to any of examples 22 to 26, wherein the computer program code is configured to, with the at least one processor, to cause the apparatus to:
transmit the radar excitation signals consecutively in time or interleaved in time.

Example 28: The apparatus according to any of examples 22 to 27, wherein the computer program code is configured to, with the at least one processor, to cause the apparatus to:
multiplex transmissions of the radar excitation signals on different beams.

Example 29: The apparatus according to any of examples 22 to 28, wherein at least one time unit in the frame structure is shared by the at least two radar excitation signals.

Example 30: The apparatus according to example 29, wherein a position of the shared time unit is defined in bursts of the at least two radar excitation signals.

Example 31: The apparatus according to any of examples 22 to 30, wherein at least one of the at least two radar excitation signals comprise user data or signaling.

Example 32: A computer program comprising computer readable program code means adapted to perform at least the following:
define at least two radar excitation signals comprising a first radar excitation signal having:
a first burst duration and a first sampling period; and
a second radar excitation signal having:
a second burst duration and a second sampling period;
wherein a first sampling period of the first radar excitation signal is configured for scanning a velocity range and a second sampling period of the second radar excitation signal is configured for scanning a portion of the velocity range, and the first burst duration is smaller than the second burst duration;

embed said at least two radar excitation signals into a frame structure for a wireless communications system; and perform at least one radar operation comprising at least one transmission based on the frame structure.

Example 33: The computer program according to example 32, comprising computer readable program code means adapted to perform:

defining the velocity resolution of the second radar excitation signal to meet the velocity resolution for measuring a velocity of a target by said at least two radar excitation signals.

Example 34: The computer program according to example 32 or 33, comprising computer readable program code means adapted to perform:

measuring a first velocity of on the basis of the first radar excitation signal;

measuring a second velocity on the basis of the second radar excitation signal;

determining at least one condition for a third velocity on the basis of the first velocity;

deriving the third velocity based on the second velocity and the at least one condition.

Example 35: The computer program according to any of examples 32 to 34, comprising computer readable program code means adapted to perform:

performing a first beam sweep with at least part of the first radar excitation signal and performing a second beam sweep with at least part of the second radar excitation signal, wherein the first beam sweep comprises a first set of beams and the second beam sweep comprises a second set of beams, wherein the first set of beams and the second set of beams comprise at least partly different beams.

Example 36: The computer program according to any of examples 32 to 34, comprising computer readable program code means adapted to perform:

applying a deterministic scheduling to the first radar excitation signal and an opportunistic scheduling to the second radar excitation signal.

Example 37: The computer program according to any of examples 32 to 34, comprising computer readable program code means adapted to perform:

transmitting the radar excitation signals consecutively in time or interleaved in time.

Example 38: The computer program according to any of examples 32 to 34, comprising computer readable program code means adapted to perform:

multiplexing transmissions of the radar excitation signals on different beams.

Example 39: The computer program according to any of examples 32 to 34, wherein at least one time unit in the frame structure is shared by the at least two radar excitation signals.

Example 40: The computer program according to example 39, wherein a position of the shared time unit is defined in bursts of the at least two radar excitation signals.

Example 41: The computer program according to any of examples 32 to 40, wherein at least one of the at least two radar excitation signals comprise user data or signaling.

Example 42: A non-transitory computer readable medium comprising program instructions stored thereon for performing at least the following:

define at least two radar excitation signals comprising a first radar excitation signal having:

a first burst duration and a first sampling period; and a second radar excitation signal having:

a second burst duration and a second sampling period;

wherein a first sampling period of the first radar excitation signal is configured for scanning a velocity range and a second sampling period of the second radar excitation signal is configured for scanning a portion of the velocity range, and the first burst duration is smaller than the second burst duration;

embed said at least two radar excitation signals into a frame structure for a wireless communications system; and perform at least one radar operation comprising at least one transmission based on the frame structure.

Example 43: The non-transitory computer readable medium according to example 42, comprising program instructions stored thereon for performing:

defining the velocity resolution of the second radar excitation signal to meet the velocity resolution for measuring a velocity of a target by said at least two radar excitation signals.

Example 44: The non-transitory computer readable medium according to example 42 or 43, comprising program instructions stored thereon for performing:

measuring a first velocity of on the basis of the first radar excitation signal;

measuring a second velocity on the basis of the second radar excitation signal;

determining at least one condition for a third velocity on the basis of the first velocity;

deriving the third velocity based on the second velocity and the at least one condition.

Example 45: The non-transitory computer readable medium according to any of examples 42 to 44, comprising program instructions stored thereon for performing:

performing a first beam sweep with at least part of the first radar excitation signal and performing a second beam sweep with at least part of the second radar excitation signal, wherein the first beam sweep comprises a first set of beams and the second beam sweep comprises a second set of beams, wherein the first set of beams and the second set of beams comprise at least partly different beams.

Example 46: The non-transitory computer readable medium according to any of examples 42 to 45, comprising program instructions stored thereon for performing:

applying a deterministic scheduling to the first radar excitation signal and an opportunistic scheduling to the second radar excitation signal.

Example 47: The non-transitory computer readable medium according to any of examples 42 to 46, comprising program instructions stored thereon for performing:

transmitting the radar excitation signals consecutively in time or interleaved in time.

Example 48: The non-transitory computer readable medium according to any of examples 42 to 47, comprising program instructions stored thereon for performing:

multiplexing transmissions of the radar excitation signals on different beams.

Example 49: The non-transitory computer readable medium according to any of examples 42 to 48, wherein at least one time unit in the frame structure is shared by the at least two radar excitation signals.

Example 50: The non-transitory computer readable medium according to example 49, wherein a position of the shared time unit is defined in bursts of the at least two radar excitation signals.

Example 51: The non-transitory computer readable medium according to any of examples 42 to 50, wherein at least one of the at least two radar excitation signals comprise user data or signaling.

Example 52: A non-transitory computer readable medium comprising program instructions stored thereon for performing at least the following:
  receiving at least two radar excitation signals embedded into a frame structure for a wireless communications system;
  measuring at least one of received signal strength, received signal quality and channel state information on the basis of the at least two radar excitation signals comprising a first radar excitation signal having:
    a first burst duration and a first sampling period; and
  a second radar excitation signal having:
    a second burst duration and a second sampling period;
  wherein the first sampling period of the first radar excitation signal is configured for scanning a velocity range and the second sampling radar excitation period of the second signal is configured for scanning a portion of the velocity range, and the first burst duration is smaller than the second burst duration.

Example 53: A computer program comprising computer readable program code means adapted to perform at least the following:
  receiving at least two radar excitation signals embedded into a frame structure for a wireless communications system;
  measuring at least one of received signal strength, received signal quality and channel state information on the basis of the at least two radar excitation signals comprising a first radar excitation signal having:
    a first burst duration and a first sampling period; and
  a second radar excitation signal having:
    a second burst duration and a second sampling period;
  wherein the first sampling period of the first radar excitation signal is configured for scanning a velocity range and the second sampling radar excitation period of the second signal is configured for scanning a portion of the velocity range, and the first burst duration is smaller than the second burst duration.

Example 54: An apparatus comprising:
  means for receiving at least two radar excitation signals embedded into a frame structure for a wireless communications system;
  means for measuring at least one of received signal strength, received signal quality and channel state information on the basis of the at least two radar excitation signals comprising a first radar excitation signal having:
    a first burst duration and a first sampling period; and
  a second radar excitation signal having:
    a second burst duration and a second sampling period;
  wherein a first sampling period of the first radar excitation signal is configured for scanning a velocity range and a second sampling period of the second radar excitation signal is configured for scanning a portion of the velocity range, and the first burst duration is smaller than the second burst duration.

Example 55: An apparatus comprising at least one processor; and at least one memory including computer program code; the at least one memory and the computer program code configured to, with the at least one processor, to cause the apparatus to:
  receive at least two radar excitation signals embedded into a frame structure for a wireless communications system;
  measure at least one of received signal strength, received signal quality and channel state information on the basis of the at least two radar excitation signals comprising a first radar excitation signal having:
    a first burst duration and a first sampling period; and
  a second radar excitation signal having:
    a second burst duration and a second sampling period;
  wherein a first sampling period of the first radar excitation signal is configured for scanning a velocity range and a second sampling period of the second radar excitation signal is configured for scanning a portion of the velocity range, and the first burst duration is smaller than the second burst duration.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

The invention claimed is:

1. A method, comprising:
  defining at least two radar excitation signals comprising a first radar excitation signal having:
    a first burst duration and a first sampling period; and
  a second radar excitation signal having:
    a second burst duration and a second sampling period;
  wherein the first sampling period of the first radar excitation signal is configured for scanning a velocity range and the second sampling period of the second radar excitation signal is configured for scanning a portion of the velocity range, and the first burst duration is smaller than the second burst duration, wherein the first radar excitation signal provides a coarse velocity resolution spanning an entire velocity range and the second radar excitation signal provides a fine velocity resolution spanning another velocity range given by the coarse velocity resolution of the first radar excitation signal;
  embedding said at least two radar excitation signals into a frame structure for a wireless communications system; and
  performing at least one radar operation comprising at least one transmission based on the frame structure.

2. The method according to claim 1, comprising:
  defining the velocity resolution of the second radar excitation signal to meet the velocity resolution for measuring a velocity of a target by said at least two radar excitation signals.

3. The method according to claim 1, comprising:
  measuring a first velocity based on the first radar excitation signal;
  measuring a second velocity based on the second radar excitation signal;
  determining at least one condition for a third velocity based on the first velocity;
  deriving the third velocity based on the second velocity and the at least one condition.

4. The method according to claim 1, comprising:
  performing a first beam sweep with at least part of the first radar excitation signal and performing a second beam sweep with at least part of the second radar excitation signal, wherein the first beam sweep comprises a first set of beams and the second beam sweep comprises a second set of beams, wherein the first set of beams and the second set of beams comprise at least partly different beams.

5. The method according to claim 1, comprising:
applying a deterministic scheduling to the first radar excitation signal and an opportunistic scheduling to the second radar excitation signal.

6. The method according to claim 1, comprising:
transmitting the radar excitation signals consecutively in time or interleaved in time.

7. The method according to claim 1, comprising:
multiplexing transmissions of the radar excitation signals on different beams.

8. The method according to claim 1, wherein at least one time unit in the frame structure is shared by the at least two radar excitation signals.

9. The method according to claim 8, wherein a position of the shared time unit is defined in bursts of the at least two radar excitation signals.

10. The method according to claim 1, wherein at least one of the at least two radar excitation signals comprise user data or signaling.

11. A method, comprising:
receiving at least two radar excitation signals embedded into a frame structure for a wireless communications system;
measuring at least one of received signal strength, received signal quality and channel state information based on the at least two radar excitation signals comprising a first radar excitation signal having:
a first burst duration and a first sampling period; and
a second radar excitation signal having:
a second burst duration and a second sampling period;
wherein the first sampling period of the first radar excitation signal is configured for scanning a velocity range and the second sampling radar excitation period of the second signal is configured for scanning a portion of the velocity range, and the first burst duration is smaller than the second burst duration, wherein the first radar excitation signal provides a coarse velocity resolution spanning an entire velocity range and the second radar excitation signal provides a fine velocity resolution spanning another velocity range given by the coarse velocity resolution of the first radar excitation signal.

12. An apparatus, comprising:
at least one processor; and
at least one memory including computer program code;
the at least one memory and the computer program code configured to, with the at least one processor, to cause the apparatus to:
define at least two radar excitation signals comprising a first radar excitation signal having:
a first burst duration and a first sampling period; and
a second radar excitation signal having:
a second burst duration and a second sampling period;
wherein the first sampling period of the first radar excitation signal is configured for scanning a velocity range and the second sampling period of the second radar excitation signal is configured for scanning a portion of the velocity range, and the first burst duration is smaller than the second burst duration, wherein the first radar excitation signal provides a coarse velocity resolution spanning an entire velocity range and the second radar excitation signal provides a fine velocity resolution spanning another velocity range given by the coarse velocity resolution of the first radar excitation signal;
embed said at least two radar excitation signals into a frame structure for a wireless communications system; and
perform at least one radar operation comprising at least one transmission based on the frame structure.

13. A computer program embodied on a non-transitory computer-readable medium, said computer program comprising computer readable program code which, when executed in hardware, cause the hardware to perform at least the following:
define at least two radar excitation signals comprising a first radar excitation signal having:
a first burst duration and a first sampling period; and
a second radar excitation signal having:
a second burst duration and a second sampling period;
wherein a first sampling period of the first radar excitation signal is configured for scanning a velocity range and a second sampling period of the second radar excitation signal is configured for scanning a portion of the velocity range, and the first burst duration is smaller than the second burst duration, wherein the first radar excitation signal provides a coarse velocity resolution spanning an entire velocity range and the second radar excitation signal provides a fine velocity resolution spanning another velocity range given by the coarse velocity resolution of the first radar excitation signal;
embed said at least two radar excitation signals into a frame structure for a wireless communications system; and
perform at least one radar operation comprising at least one transmission based on the frame structure.

* * * * *